(12) United States Patent
Huang et al.

(10) Patent No.: US 8,985,833 B2
(45) Date of Patent: Mar. 24, 2015

(54) BACKLIGHT MODULE AND A LIQUID CRYSTAL DISPLAY USING THE SAME

(71) Applicant: Shenzhen China Star Optoelectronics Technology Co., Ltd., Shenzhen, Guangdong (CN)

(72) Inventors: Chong Huang, Shenzhen (CN); Yi-Cheng Kuo, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 252 days.

(21) Appl. No.: 13/699,698

(22) PCT Filed: Oct. 26, 2012

(86) PCT No.: PCT/CN2012/083617
§ 371 (c)(1),
(2) Date: Nov. 23, 2012

(87) PCT Pub. No.: WO2014/059694
PCT Pub. Date: Apr. 24, 2014

(65) Prior Publication Data
US 2014/0112017 A1      Apr. 24, 2014

(30) Foreign Application Priority Data

Oct. 18, 2012   (CN) .......................... 2012 1 0397080

(51) Int. Cl.
*F21V 7/04* (2006.01)
*F21V 8/00* (2006.01)
(52) U.S. Cl.
CPC .................................. *G02B 6/0085* (2013.01)
USPC ......................................... 362/632; 362/294

(58) Field of Classification Search
USPC ................... 362/607, 629, 632, 294; 349/161
See application file for complete search history.

(56) References Cited

U.S. PATENT DOCUMENTS

| | | | |
|---|---|---|---|
| 6,535,266 B1 * | 3/2003 | Nemeth et al. | 349/161 |
| 7,208,713 B2 * | 4/2007 | Ishiguchi | 250/205 |
| 7,281,812 B2 * | 10/2007 | Kim | 362/97.1 |
| 7,494,259 B2 * | 2/2009 | Hayashi et al. | 362/609 |
| 8,441,608 B2 * | 5/2013 | Heo et al. | 349/161 |
| 8,668,364 B2 * | 3/2014 | Yu et al. | 362/294 |
| 8,727,551 B2 * | 5/2014 | Que et al. | 362/97.1 |
| 2006/0221295 A1 * | 10/2006 | Hein et al. | 349/161 |
| 2007/0035950 A1 * | 2/2007 | Yang | 362/294 |
| 2007/0081344 A1 * | 4/2007 | Cappaert et al. | 362/373 |
| 2007/0115686 A1 * | 5/2007 | Tyberghien | 362/580 |
| 2008/0136770 A1 * | 6/2008 | Peker et al. | 345/102 |
| 2011/0255047 A1 * | 10/2011 | Kim et al. | 349/161 |

* cited by examiner

*Primary Examiner* — John A Ward
(74) *Attorney, Agent, or Firm* — Andrew C. Cheng

(57) ABSTRACT

The present invention provides a backlight module, containing an edge-lit backlight source; a light guide plate having a light incident surface and a light emitting surface where the light incident surface faces directly towards the backlight source; an optical film set positioned on a top side of the light guide plate facing directly towards the light emitting surface of the light guide plate; a reflection plate on a bottom side of the light guide plate; and a thermal conductive layer on a bottom side of the reflection plate conducting heat produced from the backlight source at least to the center of the reflection plate. The backlight module raises the temperature in the center of the panel, thereby preventing the cross talk resulted from having lower temperature in the center of the panel. There is no significant change to the existing backlight modules and therefore the cost is low.

5 Claims, 3 Drawing Sheets

BACKLIGHT MODULE AND A LIQUID CRYSTAL DISPLAY USING THE SAME

This application claims the benefit of People's Republic of China patent application No. 201210397080.X, filed Oct. 18, 2012, which application is incorporated by reference herein in its entirety.

BACKGROUND OF THE INVENTION

1. Field of the Invention

The present invention generally relates to thin film transistor liquid crystal display (TFT-LCD) technique, and particularly relates to a backlight module and a liquid crystal display (LCD) using the backlight module.

2. The Related Arts

Currently the backlight module of most TFT-LCD adopts either edge-lit or direct-lit backlight. However, as the backlight module is required to be lighter and thinner, the edge-lit backlight design using light emitting diode (LED) is more favorable.

The edge-lit LED backlight has some disadvantages. For example, the center of the backlight module's panel is possible to have a lower temperature. If this is the case, the display quality would be affected. Especially when 3D images are displayed, they are very possible to be affected by cross talks.

Regarding the cross talk resulted from having lower temperature in the center of the panel, it is currently resolved by improving the panel's internal structure and the corresponding driver circuit, such as modifying the light mask. However, this resolution would lead to higher structural complexity and cost, and therefore is not ideal for cost optimization.

SUMMARY OF THE INVENTION

The technical issue to be addressed by the present invention is to provide a backlight module and a LCD using the backlight module adopting a relatively simple structure to resolve the low temperature problem in the center of the LCD's panel.

To address the technical issue, the present invention provides a backlight module, containing an edge-lit backlight source;

a light guide plate having a light incident surface and a light emitting surface where the light incident surface faces directly towards the edge-lit backlight source;

an optical film set positioned on a top side of the light guide plate facing directly towards the light emitting surface of the light guide plate;

a reflection plate on a bottom side of the light guide plate; and a thermal conductive layer on a bottom side of the reflection plate by coating or printing a layer of thermal conductive material at least on a portion of the bottom side of the reflection plate for conducting heat produced from the edge-lit backlight source at least to the center of the reflection plate.

The thermal conductive layer is a thermal conductive metallic ion layer or a thermal conductive metallic particle layer.

The thermal conductive layer contains a plurality of thermal conductive strips intersecting each other into a mesh or in parallel.

To address the technical issue, the present invention provides another backlight module, containing an edge-lit backlight source;

a light guide plate having a light incident surface and a light emitting surface where the light incident surface faces directly towards the edge-lit backlight source;

an optical film set positioned on a top side of the light guide plate facing directly towards the light emitting surface of the light guide plate;

a reflection plate on a bottom side of the light guide plate; and a heating layer on a bottom side of the reflection plate by etching or printing a conductive circuit layer at least on a portion of the bottom side of the reflection plate for heating up the reflection plate.

The heating layer contains a plurality of heating strips intersecting each other into a mesh or in parallel, or a plurality of discrete and distributed heating pieces.

To address the technical issue, the present invention further provides a liquid crystal display incorporating the above described backlight module.

According to the present invention, by configuring thermal conductive layer or heating layer beneath the reflection plate, the heat from the backlight source is conducted to the center of the panel, or the reflection plate is directly heated, so as to raise the temperature in the center of the panel, thereby preventing the cross talk resulted from having lower temperature in the center of the panel.

In addition, the thermal conductive layer is a layer of thermal conductive material (metallic ions or particles) coated or printed at least on a portion of the bottom side of the reflection plate, and the heating layer is a conductive circuit layer etched or printed at least on a portion of the bottom side of the reflection plate. There is no significant change to the existing backlight modules. The cost is low and therefore a wide applicability is expected.

The advantage of the present invention is as follows. In contrast to the prior art, by winging second sections to the rectangular first section, the present invention diverts the impact of the no-guarantee area's rounded corners to the second sections, thereby improving the filling ratio of the first sections during the evaporation process, reducing the ineffective area sizes, and enhancing the aperture ratio of the OLED display panel.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
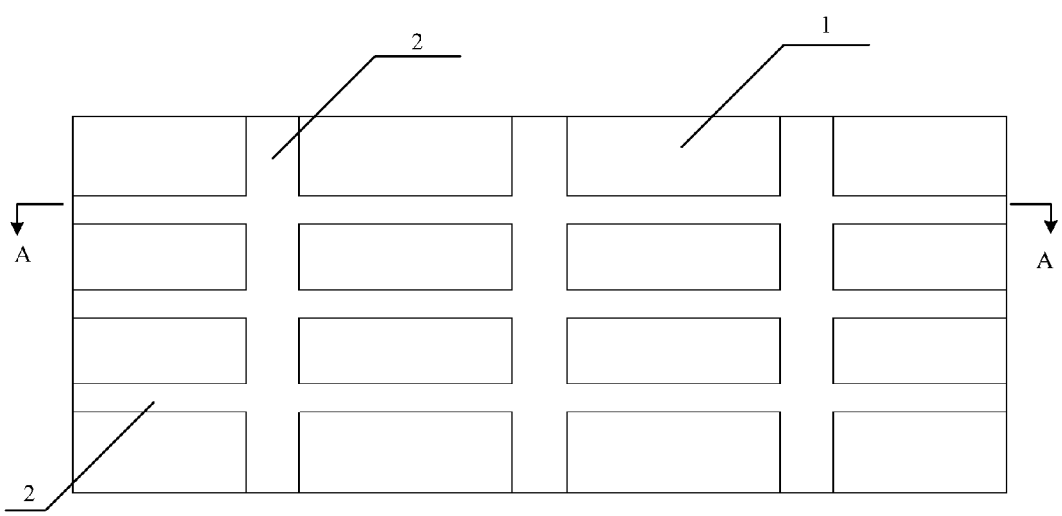
FIG. 1 is a schematic diagram showing a reflection plate according to an embodiment of the present invention.
Figure 2:
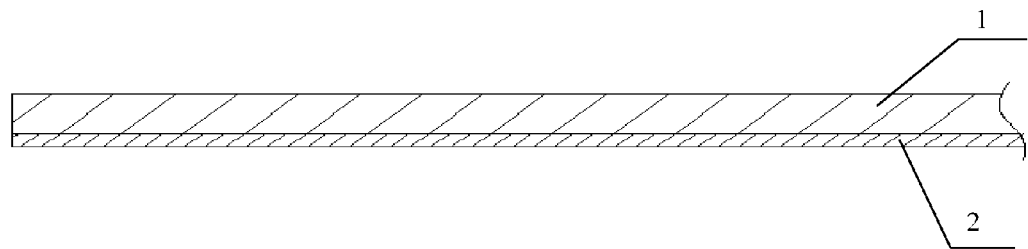
FIG. 2 is a sectional diagram showing the reflection plate of FIG. 1 along the A-A line.
Figure 3:
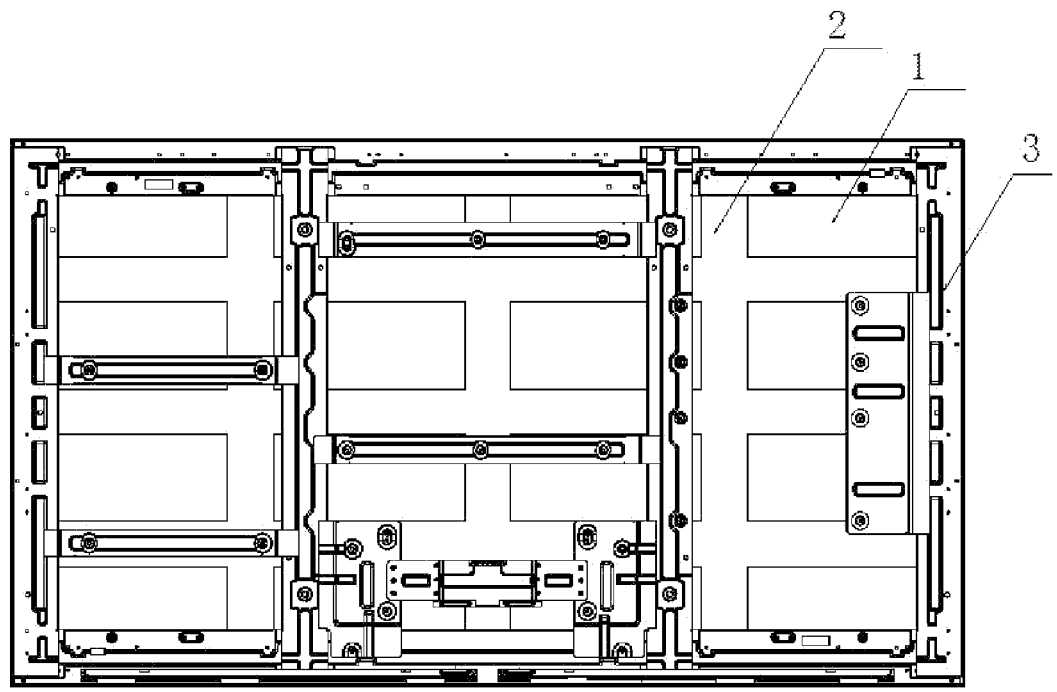
FIG. 3 is a rear-view diagram showing backlight module incorporating the reflection plate of FIG. 1.
Figure 4:
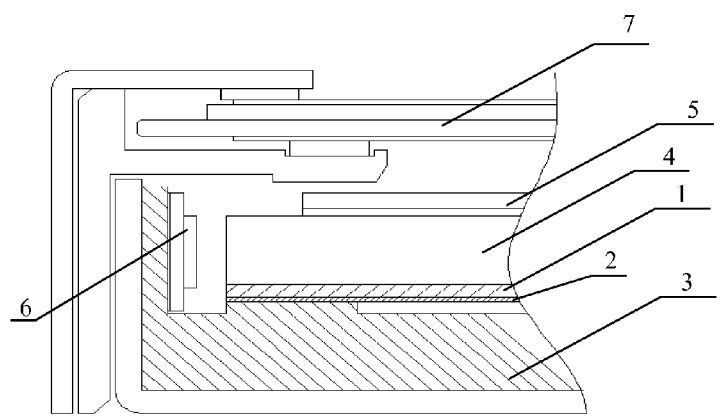
FIG. 4 is a sectional diagram showing a backlight module according to an embodiment of the present invention.

Together with the accompanied drawings, detailed description to the embodiments of the present invention is provided as follows FIGS. 1 to 4 depict a backlight module according to an embodiment of the present invention. As illustrated, the backlight module contains the following components.

An edge-lit backlight source 6, preferably using LEDs, is generally affixed to a back plate 3 or an aluminum extrusion along a side.

A light guide plate 4 has a light incident surface and a light emitting surface. The light incident surface faces directly towards the edge-lit backlight source 6, and the light guide plate 4 directs the light beams from the backlight source 6 to radiate out of the light emitting surface.

An optical film set 5 is positioned on top of the light guide plate 4, facing directly towards the light emitting surface and receiving the light beams out of the light guide plate 4. The optical film set 5 generally contains a number of optical films such as the diffusion plate or prism sheet whose purpose is to enhance the uniformity and luminance of the light beams out of the light guide plate 4.

A panel 7 is positioned above the optical film set 5.

A reflection plate 1 is positioned beneath the light guide plate 4 to reflect the light from the backlight source 6 into the light guide plate 4 as much as possible.

A thermal conductive layer 2 is positioned beneath the reflection plate 1 to conduct the heat from the backlight source 6 at least to the center of the reflection plate 1.

The thermal conductive layer 2 is formed by coating or printing a thermal conductive material at least on a portion of the bottom side of the reflection plate 1. The thermal conductive layer 2 is a thermal conductive metallic ion layer or particle layer with highly thermal conductive metals such as aluminum (Al), Copper (Cu), Aluminum oxide ($Al_2O_3$), etc.

As shown in FIG. 1, the thermal conductive layer 2 contains multiple thermal conductive strips intersecting each other into a mesh. Alternatively, the thermal conductive material can be coated or printed on the entire bottom side of the reflection plate 1.

Due to the configuration of the thermal conductive layer 2 beneath the reflection plate 1, and through the heat conduction by the thermal conductive layer 2, the heat produced from the backlight source 6 is conducted throughout the entire thermal conductive layer 2, or at least to the center of the reflection plate 1. Then, through the reflection plate 1, the light guide plate 4, and the optical film set 5, the panel 7's center or other area is warmed up, thereby preventing the cross talk resulted from having lower temperature in the center of the panel 7.

Figure 5:
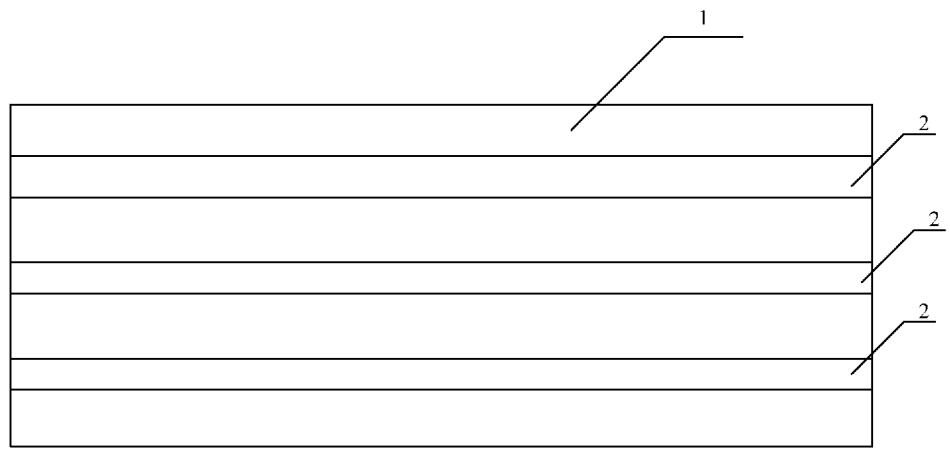
FIG. 5 is a schematic diagram showing a reflection plate according to another embodiment of the present invention.

In another embodiment of the present invention shown in FIG. 5, the thermal conductive layer 2 contains multiple thermal conductive strips 2 in parallel. In yet another embodiment of the present invention shown in FIG. 6, a heating layer 20, instead of the thermal conductive layer 2, is configured beneath a reflection plate 1 so as to heat up the reflection plate 1.

Figure 6:
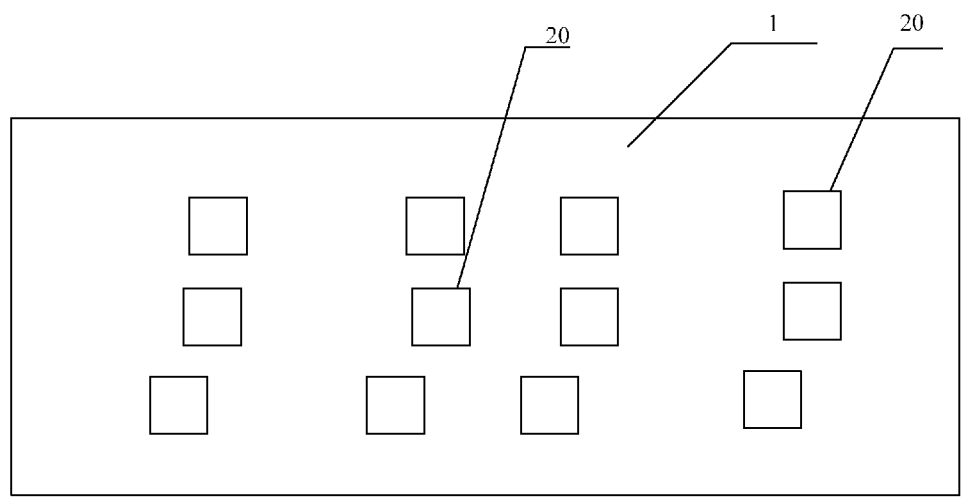
FIG. 6 is a schematic diagram showing a reflection plate according to yet another embodiment of the present invention.

The heating layer 20 is a conductive circuit layer etched or printed at least on a portion of the bottom side of the reflection plate 1. By applying electricity on the conductive circuit layer, the reflection plate 1 is heated up. Then, through the light guide plate 4, and the optical film set 5, the panel 7's center or other area is warmed up, thereby preventing the cross talk resulted from having lower temperature in the center of the panel 7. As shown in FIG. 6, the heating layer 20 contains discrete and distributed heating pieces on the bottom side of the reflection plate 1.

The heating layer 20 can also be implemented as a number of heating strips intersecting each other into a mesh or in parallel as shown in FIG. 1 and FIG. 5.

The present invention also provides a LCD incorporating the above described backlight module.

The present invention has the following advantages.

By configuring thermal conductive layer or heating layer beneath the reflection plate, the heat from the backlight source is conducted to the center of the panel, or the reflection plate is directly heated, so as to raise the temperature in the center of the panel, thereby preventing the cross talk resulted from having lower temperature in the center of the panel.

In addition, the thermal conductive layer is thermal conductive material (metallic ions or particles) coated or printed at least on a portion of the bottom side of the reflection plate, and the heating layer is a conductive circuit layers etched or printed at least on a portion of the bottom side of the reflection plate. There is no significant change to the existing backlight modules. The cost is low and therefore a wide applicability is expected.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A backlight module, comprising
   an edge-lit backlight source;
   a light guide plate having a light incident surface and a light emitting surface where the light incident surface faces directly towards the edge-lit backlight source;
   an optical film set positioned on a top side of the light guide plate facing directly towards the light emitting surface of the light guide plate;
   a reflection plate on a bottom side of the light guide plate; and
   a thermal conductive layer at least on a portion of the bottom side of the reflection plate for conducting heat produced from the edge-lit backlight source at least to the center of the reflection plate;
   wherein the thermal conductive layer comprises a plurality of thermal conductive strips intersecting each other into a mesh.

2. The backlight module as claimed in claim 1, wherein the thermal conductive layer is one of a thermal conductive metallic ion layer and a thermal conductive metallic particle layer.

3. A backlight module, comprising
   an edge-lit backlight source;
   a light guide plate having a light incident surface and a light emitting surface where the light incident surface faces directly towards the edge-lit backlight source;
   an optical film set positioned on a top side of the light guide plate facing directly towards the light emitting surface of the light guide plate;
   a reflection plate on a bottom side of the light guide plate; and
   a conductive circuit layer at least on a portion of the bottom side of the reflection plate for heating up the reflection plate;

wherein the conductive circuit layer comprises a plurality of heating strips intersecting each other into a mesh.

4. A liquid crystal display, comprising a backlight module which comprises
- an edge-lit backlight source;
- a light guide plate having a light incident surface and a light emitting surface where the light incident surface faces directly towards the edge-lit backlight source;
- an optical film set positioned on a top side of the light guide plate facing directly towards the light emitting surface of the light guide plate;
- a reflection plate on a bottom side of the light guide plate; and
- one of a thermal conductive layer and a conductive circuit layer at least on a portion of a bottom side of the reflection plate, the thermal conductive layer conducting heat produced from the edge-lit backlight source at least to the center of the reflection plate, the conductive circuit layer heating up the reflection plate;
- wherein the thermal conductive layer comprises a plurality of thermal conductive strips intersecting each other into a mesh, and
- the conductive circuit layer comprises a plurality of heating strips intersecting each other into a mesh.

5. The liquid crystal display as claimed in claim 4, wherein the thermal conductive layer is one of a thermal conductive metallic ion layer and a thermal conductive metallic particle layer.

\* \* \* \* \*